Patented Nov. 24, 1925.

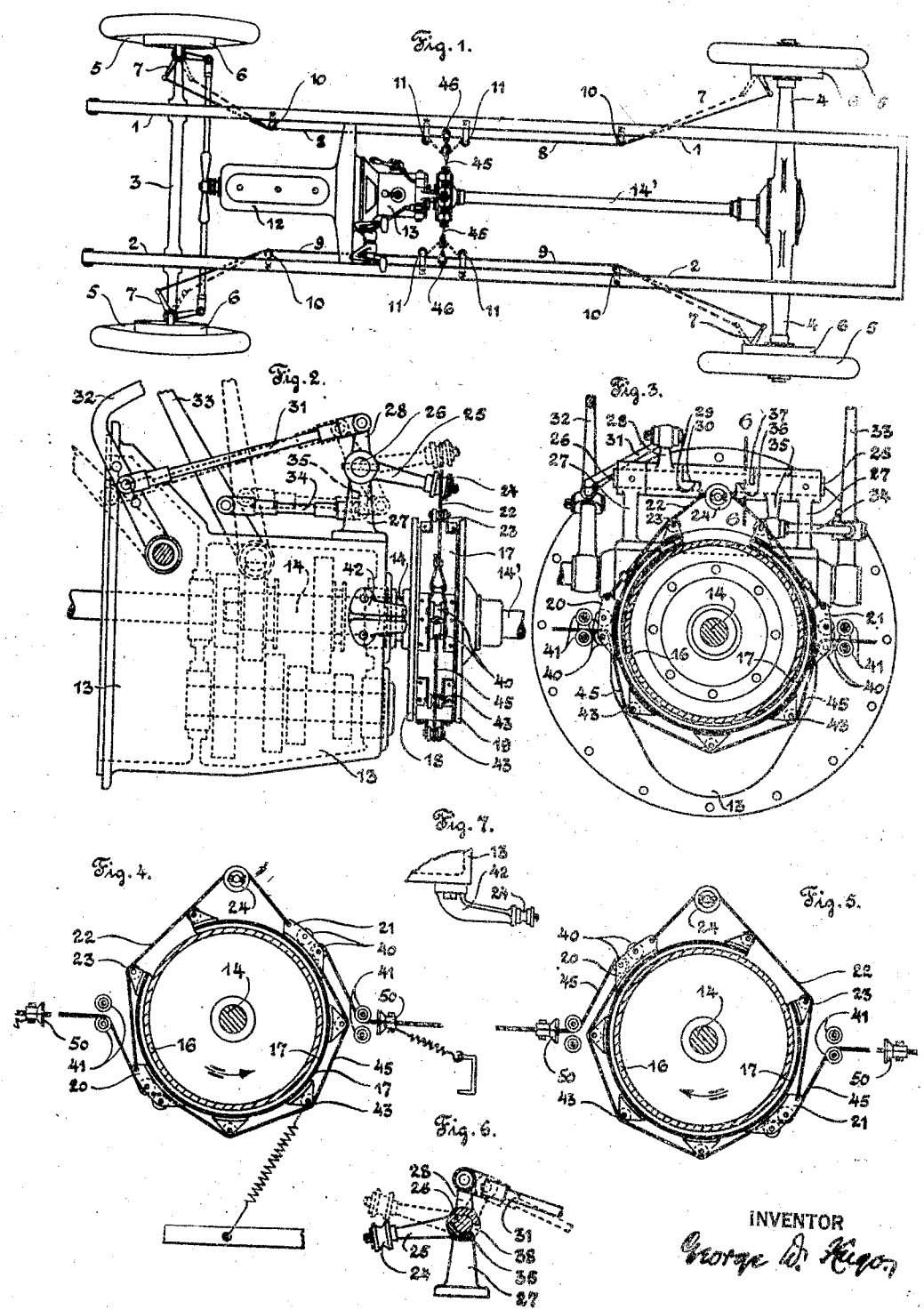

1,562,830

UNITED STATES PATENT OFFICE.

GEORGE D. HUGO, OF SEATTLE, WASHINGTON.

BRAKE-OPERATING MECHANISM.

Application filed October 8, 1923. Serial No. 667,194.

*To all whom it may concern:*

Be it known that I, GEORGE D. HUGO, a citizen of the United States, and a resident of the city of Seattle, county of King, State of Washington, have invented certain new and useful Improvements in Brake-Operating Mechanism, of which the following is a specification.

This invention relates to brake operating mechanism, more particularly to improvements in mechanism used in connection with and for the actuation of braking members of automobiles, trucks, passenger stages and other motor driven vehicles.

The great weight of present day vehicles of the above character and the high speed at which they travel often requires, for retardation and stopping, the application of braking pressure for which the physical strength of the average driver is not sufficient. The advent of the four wheel brakes, which feature present day automobile construction, the greatly increased number of motor vehicles in use and the increased necessity of safety precautions, has, all the more, made it necessary that some mechanism be provided for operating the brakes, that is more positive and more powerful than the braking force that can normally be exerted by the driver.

In automobiles of present day construction, space and design limits the leverage and linkage of the braking mechanism and, for this reason, a desired braking pressure cannot be derived through hand or foot operated levers. This is especially true of vehicles equipped with brakes on more than two wheels, and of heavy trucks and passenger stages.

In view of the above, it is the principal object of this invention to provide improvements in brake actuating mechanism through which the inertial energy, or the momentum, of a moving vehicle to which the mechanism is applied, may be converted into force for applying the brakes. More specifically stated, the object of the invention resides in the provision of means in connection with the wheel braking members and with the power transmission shaft of an automobile, whereby the power that is transmitted to the drive shaft by the momentum of the vehicle, or in some instances the power of the engine, may be utilized, under the control of a hand lever or foot pedal, for actuating the brakes.

It is also an object of this invention, to provide for a positive distribution and for the equalization of the braking forces as applied to all brake drums, and for a reaction of forces from one drum to the others.

A further object is to provide mechanism of the above character that will serve as a wheel lock when the vehicle is standing and also as an emergency brake in case the wheel brakes fail to function.

Another object is to provide means for increasing the brake arm movement without increasing leverage or distance of travel of the hand or foot control lever and thereby avoid the necessity of frequent readjustment of brakes.

Another object is to provide brake actuating means of the above character which automatically distributes the braking forces applied to the several wheels in such manner that the possibility of skidding is reduced to a minimum.

In accomplishing these and other objects of the invention, improved details of construction have been provided, the preferred forms of which are illustrated in the accompanying drawings, wherein:

Fig. 1 is a plan view of a vehicle chassis equipped with four wheel brakes and provided with brake actuating mechanism embodied by this invention.

Fig. 2 is a side elevation of the transmission case of the vehicle and the brake control mechanism mounted adjacent thereto in accordance with the present invention.

Fig. 3 is a rear view of the same, partly in section for better illustration.

Figs. 4 and 5 are diagrammatic illustrations, which show respectively the brake actuating band in braking positions for forward and reverse driving.

Fig. 6 is a transverse section, taken on line 6—6 in Fig. 3.

Fig. 7 is a detail plan view of a guide roller supporting bracket.

Referring more in detail to the drawings, 1 and 2 respectively designate the longitudinal beams at opposite sides of a frame, which may be that of the ordinary type of motor vehicles. 3 and 4 designate the forward and rearward axles and 5 the ground wheels mounted at their ends. In the present illustration, each wheel is equipped with a brake drum 6 and each drum has braking members within it, not shown, adapted to be actuated into and from braking contact with the drums by pivotal movement of the brake arms 7.

The brake arms for the two wheels at each side of the frame are connected by cables 8 and 9 respectively which extend over guide pulleys 10 mounted on the frame in such manner as to retain the cables, throughout the greater portion of their length, parallel with and adjacent the beams, as is best shown in Fig. 1. The cables also extend within spaced guides 11, secured to the frame, and between which connection of the cables with the control mechanism is made, as will later be more fully described. 12 designates what may be the engine of the vehicle and 13 the transmission case or housing wherein the transmission shaft 14 and the speed changing gears are contained. The driving shaft 14' extends rearwardly from shaft 14 to an operative connection, through axle 4, with the rear or driving wheels. The manner of making this connection, as well as the design of the engine and transmission case is immaterial and need no further description.

Secured to the transmission shaft 14, preferably at a point just back of the transmission housing, is a drum 16 about which a friction band 17 is floatingly fitted. The drum is rotatable within the band and the band is held functionally between flanges 18 and 19 at opposite edges of the drum. The band is made of flexible material, preferably spring steel, that is shaped to conform to the curvature of the drum and is provided, on its inner surface, with a suitable lining. It does not entirely encircle the drum and its two ends are disposed in spaced relation normally at the top of the drum, as shown in Fig. 3.

Secured to the opposite sides of the band are brackets 20 and 21 to which are attached the ends of a cable 22 that extends over guides 23 fixed to the band adjacent its ends, and at its center over a pulley wheel 24 that is mounted at the end of a lever arm 25 which by means, as presently described, may be moved upwardly to cause tension to be exerted on the band whereby the latter will be tightened against the drum so that it will tend to rotate therewith.

The lever arm 25, at its inner end, is rotatable on a supporting shaft 26 that is mounted at its opposite ends in standards 27 that are fixed upon the housing 13, or any fixed stationary part of the vehicle frame. At one end of this shaft is a rotatably mounted lever arm 28 provided with a shoulder 29 adapted to engage with an opposing shoulder 30 on the lever 25. The outer end of the lever 28 is connected by means of a link 31 with a pivotally mounted foot pedal 32 which, when depressed, will effect pivotal movement of levers 28 and 25 to cause a tightening of the band 17 about the drum. A like movement of the lever 25 may be effected by rearward movement of an emergency lever 33 that is pivotally supported from the side of the housing 13 opposite pedal 32, and which is connected by means of a link 34 with a lever 35 on the end of the shaft 26 opposite lever 28 and which has a shoulder 36 adapted for engagement with a shoulder 37 on the arm 25. As will be seen in Fig. 6, there is a portion cut away from the lever 35, as at 38, to leave space for braking movement of lever 25 by the foot pedal without effecting movement of the emergency lever. This arrangement is also provided for in the construction of lever 28 so that operation by means of the emergency brake will not be opposed.

Mounted on the brackets 20 and 21 are paired vertically spaced guide rollers 40 and adjacent thereto in horizontal alinement are paired, similarly spaced guide rollers 41 that are mounted on brackets 42 fastened to the opposite sides of the housing 13, or to a fixed member in the vehicle frame. Extended about the lower portion of the band 17, over a plurality of guide rollers 43 mounted on the latter, is a taut cable 45, the end portions of which are extended between the paired guide rollers 40 and 41 at opposite sides of the drum, and to these ends are attached pulleys 46 which are mounted on the cables 8 and 9 between the guides 11.

It will be stated here that the wheel brakes are of the conventional type commonly used and the brake shoes of the several drums on the wheels are equipped with springs whereby they are normally held disengaged from the drums, and that these springs, acting on the lever arms 7, retain the cables 8 and 9 taut. These latter cables likewise retain cable 45 drawn taut and this, while not positively connected with the band 17, retains it in neutral position, as is shown in Fig. 3. Should the springs of the brake mechanism prove to be insufficient additional springs 55 for the above purpose are attached to fixed parts of the vehicle and to the band 17 and to the cable 45 at opposite sides of the drum as is designated in Fig. 4.

Assuming the parts to be so constructed and assembled as described, the operation would be as follows:

With the vehicle in motion, either forward or backward, should it be desired to apply the brakes, the driver depresses the foot pedal 32, thereby rotating lever 28 to swing lever 25 upwardly. This movement tightens the cable 22 and draws the band 17 against the drum 16 so that the band, due to frictional contact, tends to rotate with the drum. Should the vehicle be moving forward, the band 17 will be moved from neutral position, as shown in Fig. 3, toward the position as shown in Fig. 4, or if in reverse gear, it moves toward position as shown in Fig. 5, thereby causing the paired rollers 40 to move radially from horizontal alinement with paired rollers 41 to cause a more extended wrapping of cable 45 about the band and drum and consequently a drawing in of its ends and the tightening and drawing in of cables 8 and 9; these latter cables, being connected with brake arms 7, will cause the brakes to be applied. It is apparent also that a like movement will take place by operating the emergency lever and that the action is the same whether the vehicle is moving forward or rearward.

It is to be noted that an equalization of braking forces as applied to all brakes is obtained by this construction for the reason that the cable 45 is not positively fixed to the band 17 and may slide freely within the guide rollers 40 and upon rollers 43 so that the tension created thereon by movement of the band 17 will be equally applied to the cables 8 and 9 and these, due to their freedom of movement on their guide rollers 10 and 11, will effect an equal application of braking pressure by the brakes with which they connect.

The full length of the frictional surface of the band 17 is retained in functional relation to the drum during a braking operation for the reason that, when the band is rotatably advanced in either direction, the guide rollers 23 at its ends are wedged beneath the cable 22, see Figs. 4 and 5, and the tendency of the band to rotate increases its pressure against the drum and causes a greater tightening of the braking connections. Therefore, the braking pressure varies in accordance with the tension applied through cable 22.

When pressure is released from the foot pedal, or emergency lever, the releasing springs in the brake drums and springs 35 act through the cables to draw band 17 and operating members back to neutral position.

In order that the danger of accidents be reduced to a minimum, due to possible breaking of a cable at either side of the vehicle, safety stops 50 have been fixed to the cable 45 at opposite sides of the drum, so that should either cable 8 or 9 break, the stop at that side will engage with the adjacent paired rollers 41 to limit movement of the cable and to thereby insure a continued functioning of the other cable and brakes with which it is connected.

Brake actuating means, as above described, can be made, by proper connection, to actuate the brakes singly, in pairs, or in various combinations as may be desired, thus providing for the application of braking pressure on some wheels in advance of others and for a variation of braking pressure upon the different brake drums.

While the cable 45 is shown to be connected to actuate the wheel brakes through cables 8 and 9, it is to be understood that other means of connection could be employed and that the mechanism is also applicable to vehicles with brakes on but two wheels.

It is also to be understood that instead of cables 22 and 45 other means of connection, such as chains, tapes, ropes etc. could be used, also that rods, chains etc. could be utilized in place of cables 8 and 9 and these connected through suitable equalizers with the brake arms.

Further be it understood that, while a specific hand lever and foot pedal control and mechanism connected therewith has been described and illustrated, it is not intended to be confined to this, as it is apparent that different constructions could, or would be employed to suit the particular design of the vehicle equipped with this braking system.

From the foregoing description can be seen that, while it requires but a slight pressure on the foot pedal or a light pull on the hand lever to engage the band 17 with the drum 16, the braking force derived from the momentum of the vehicle is relatively great and may be varied in accordance with the force applied through the hand lever or foot pedal, thus there may be converted from the inertia of the vehicle a force of ample capacity for the operation of four wheel brakes of fast and heavy vehicles, without loss of efficiency through the distribution of the braking power.

It is further apparent, that this type of mechanism functions with equal effectiveness on either forward or reverse speeds and the operation is unaffected by spring deflection, elongation of the cables and wear of the wheel braking members.

Having thus described my invention, what I claim as new therein, and desire to secure by Letters Patent is:

1. In a vehicle of the class described, a braking mechanism, a rotatably driven member, a contact member adapted to be frictionally engaged with said rotatably driven member and to be moved by such contact, a guide on the said contact member, a stationary guide and a flexible member extended through said guides and having operative connection with the braking mechanism whereby the latter will be actuated by rotative movement of the control member in either direction.

2. In a vehicle of the class described, having braking mechanisms at opposite sides, a rotatably driven drum, a segmental band disposed loosely about the drum, guide members on the band, a flexible member extended through the guide members and connected at its ends with the braking mechanisms, and means for drawing the segmental band into frictional contact with the drum to effect rotative movement of the band and a resultant drawing in of the ends of the flexible member and the actuation of the braking mechanisms.

3. In a vehicle of the class described having braking mechanisms at opposite sides, a rotatably driven drum, a segmental band disposed loosely about the drum, guide members on the band, stationary guides at the opposite sides of the drum, a flexible member extended slidably through the guide members on the band and said stationary guides and connected at its opposite ends with the braking mechanisms at opposite sides, and means for moving the band into frictional contact with the drum to effect rotative movement of the band and a resultant drawing in of the ends of the flexible member and an equal application therethrough of braking forces to the braking mechanisms with which the ends of the flexible member connect.

4. In a vehicle of the class described having wheel braking mechanisms, a rotatably driven drum, a segmental band disposed loosely about the drum, guide members on the band, means for drawing the band into frictional contact with the drum to effect rotative movement thereof, a flexible member extended through the guide members of the band operatively connected at its ends for actuating the brake mechanisms upon rotative movement of the band, and providing for a reaction between the brakes and an equal distribution of the applied force to the brake mechanisms.

5. In a vehicle of the class described equipped with wheel braking means at opposite sides, a rotatable shaft having driving connection with the vehicle wheels, a drum rotatable with the shaft, a yieldable band partly encircling the drum, guide members on the band, a pivotally movable lever, a cable connected with said band and having operative connection with said lever, manual control means for actuating the lever to cause said band to be drawn by said cable into frictional engagement with the drum to thereby effect rotative movement of the band with the drum and a flexible member having operative connections at its ends with the brake mechanisms at opposite sides of the vehicle and through which the latter are actuated by rotative movement of the band.

6. In a vehicle of the class described, having braking means at its opposite sides, a rotatable shaft having driving connection with the vehicle wheels, a drum rotatable with the shaft, a yieldable band partly encircling the drum, a pivotally movable lever, a cable connected with said band and having operative connection with said lever, manual control means for actuating the lever to cause said band to be drawn by said cable into frictional engagement with the drum to thereby effect rotative movement of the band with the drum, a cable connected at its ends with the brake actuating means and having a connection intermediate its ends with the said band whereby rotative movement of the band in either direction effects actuation of the braking mechanism.

7. In a vehicle of the class described, having braking means at its opposite sides, a rotatable shaft having driving connection with the vehicle wheels, a drum rotatable with the shaft, a yieldable band partly encircling the drum, a pivotally movable lever, a cable connected with said band and having operative connection with said lever, manual control means for actuating the lever to cause said band to be drawn by said cable into frictional engagement with the drum to thereby effect rotative movement of the band with the drum, a cable connected at its ends with the brake actuating means and having a connection intermediate its ends with the said band whereby rotative movement of the band in either direction effects actuation of the braking mechanism, and yieldable means for moving the band and associated parts back to neutral position upon release of the control means.

8. In a vehicle having wheel braking means at opposite sides, a rotatable shaft operatively connected with said wheels, a drum rotatable with said shaft, a yieldable band partly encircling the drum, paired guide rollers fixed to the band at opposite sides, paired guide rollers supported from the vehicle adjacent to the first named paired rollers, a cable extended partly about the band in disconnected relation thereto and between said paired rollers and having operative connection at its ends with the brake actuating means at opposite sides of the vehicle, manually operable means for actuating the band into frictional contact with the drum to cause rotative movement of the band whereby the ends of said cable are drawn in and the braking mechanism actuated.

9. In a vehicle having wheel braking mechanism at its opposite sides, a rotatable shaft having driving connection with said wheels, a drum rotatable with said shaft, a yieldable friction band disposed about the drum, guide rollers fixed in paired relation on the band at opposite sides of the drum, paired guide rollers supported from a fixed member adjacent to the first named rollers, guide rollers mounted on the band between the paired rollers, a cable extended over the last named guide rollers and between said rollers at opposite sides of the band and those mounted on the frame and having operative connection at its ends with the brake mechanism, a cable having its ends fixed to the band at opposite sides of the drum, a pivotally mounted lever connected with the cable and independently operable hand and foot controls for actuating the lever to cause the band to be drawn into frictional contact with the drum.

10. A mechanism as set forth in claim 6 wherein means (50) is provided for limiting movement of the last named cable in opposite directions.

11. A mechanism as recited in claim 6 wherein there are guides (41) for the last named cable mounted on a fixed member at opposite sides of the drum and stop members (50) are fixed to the cable and adapted to engage with said guides for the purpose set forth.

12. In a vehicle of the class described equipped with wheel braking means, a rotatable shaft having driving connection with the vehicle wheels, a drum rotative with the shaft, a friction band applied about the drum, a pivotally movable lever, a cable extended over said lever and connected at its ends to the band at opposite sides of the drum, manually operable means for actuating the lever to tension the cable to cause the band to be drawn thereby into frictional engagement with the drum to effect rotative movement of the band, and rollers (23) fixed to said band and adapted, by such rotative movement, to be moved into wedging contact with the tensioning cable to cause a further tightening of the band against the drum.

Signed at Seattle, Wash., this 29 day of September, 1923.

GEORGE D. HUGO.